United States Patent [19]
Sorin et al.

[11] Patent Number: 5,982,791
[45] Date of Patent: Nov. 9, 1999

[54] WAVELENGTH TRACKING IN ADJUSTABLE OPTICAL SYSTEMS

[75] Inventors: Wayne V. Sorin, Mountain View; Douglas M. Baney, Los Altos, both of Calif.

[73] Assignee: Hewlett-Packard Company, Palo Alto, Calif.

[21] Appl. No.: 09/006,854

[22] Filed: Jan. 14, 1998

[51] Int. Cl.⁶ .................................................. H01S 3/10
[52] U.S. Cl. .......................................... 372/25; 359/247
[58] Field of Search ................................ 385/24; 372/25; 359/247, 263, 291, 573

[56] References Cited

U.S. PATENT DOCUMENTS

| | | | |
|---|---|---|---|
| 5,418,802 | 5/1995 | Chwalck | 372/32 |
| 5,469,520 | 11/1995 | Morey et al. | 385/37 |
| 5,511,086 | 4/1996 | Su | 372/32 |
| 5,555,118 | 9/1996 | Huber | 359/125 |
| 5,579,143 | 11/1996 | Huber | 359/130 |
| 5,600,473 | 2/1997 | Huber | 359/179 |

FOREIGN PATENT DOCUMENTS

0730172A1  9/1996  European Pat. Off. ........ G02B 6/293

OTHER PUBLICATIONS

Giles, C.R., "Lightwave Applications of Fiber Bragg Gratings," *Journal of Lightwave Technology*, vol. 15, No. 8, Aug. 1997, pp. 1391–1404.

*Primary Examiner*—Rodney Bovernick
*Assistant Examiner*—Robert E. Wise

[57] ABSTRACT

An optical system such as an add and/or drop WDM multiplexer allows the wavelength fluctuation of an optical carrier to be tracked so that a corresponding fiber Bragg grating (FBG) can be responsively tuned. The preferred embodiment of the wavelength tracking system in an optical system such as an add and/or drop module includes a three-port optical circulator, three optical fibers, a series of tunable FBGs, a source of a broadband optical noise signal, an optical spectrum analyzer (OSA), and an FBG tuner. In operation, an LED generates modulated probe lightwaves that are inserted into a drop module. The LED lightwaves and the optical carriers propagating through the drop module are monitored by an OSA. The monitoring procedure determines the conditions, in terms of target wavelengths of the FBGs, and the stability or instability of the optical carriers. The FBGs are then tuned in response to the FBG and optical carrier information. In another embodiment, the wavelength of an optical carrier is tracked using a modulated tracking grating and an FBG is adjusted in response to the tracking information.

18 Claims, 6 Drawing Sheets

WAVELENGTH TRACKING IN ADJUSTABLE OPTICAL SYSTEMS

TECHNICAL FIELD

The invention relates generally to lightwave communications systems and more specifically to optical systems utilizing fiber Bragg gratings that are responsive to fluctuations in optical carrier wavelength.

BACKGROUND ART

Lightwave networks are increasingly being used to rapidly transfer information around the world. Lightwave networks include a number of stations, or nodes, that are interconnected by waveguides, typically optical fibers.

Inside an optical fiber, pulses of light are transferred over long distances with minimal loss. The conventional sources of the light pulses in lightwave networks are laser diodes (LD). At each end of the optical fibers in lightwave networks are various hardware devices, such as switches, amplifiers, multiplexers, and demultiplexers, that are critical to the function of lightwave networks.

Fiber Bragg gratings (FBGs) are important building blocks in a variety of lightwave network devices. An FBG acts to reflect light energy having a certain wavelength back in the direction from which the light originated. When a series of different wavelengths is present in a waveguide, FBGs can be used as filters to isolate light energy having a particular wavelength.

An FBG establishes a periodic change in refractive index along a core of an optical waveguide, typically an optical fiber. At each period, a portion of the optical wave is reflected, inducing interference in a constructive manner. The strength of the change in refractive index along with the grating period and the length of the FBG are factors that determine the range of wavelengths that will be reflected, as well as the efficiency of reflection.

The filtering properties and versatility of FBGs have led to the use of FBGs in such devices as wavelength-stabilized lasers, fiber lasers, remotely pumped amplifiers, Raman amplifiers, wavelength converters, passive optical networks, wavelength division multiplexers, demultiplexers, add/drop multiplexers, dispersion compensators, and gain equalizers. An add or drop multiplexer allows a specific signal or channel to be added to or dropped from a group of channels. Adding and/or dropping a specific channel is important because optical data is often transmitted in a multiplexed condition, whereby multiple channels of varying wavelengths are sent simultaneously over a single optical fiber. Using an add and/or drop multiplexer allows a particular channel to be singled out from a group of, for example, eight, sixteen, or possibly sixty-four channels. A dispersion compensator compensates for the time delay that develops when an optical pulse spreads due to its different wavelengths traveling at different speeds.

Figure 1:
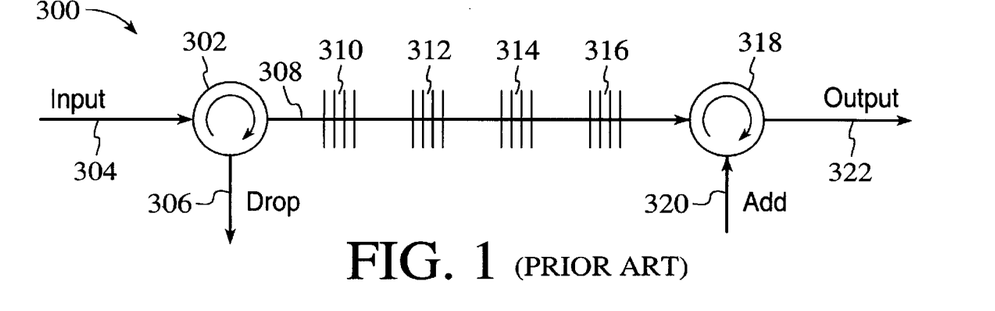
FIG. 1 is a prior art add/drop system utilizing circulators and FBGs.

An example of a conventional add/drop multiplexer 300 is shown in FIG. 1. A first three-port circulator 302 is connected to an input fiber 304, a drop fiber 306 and a central fiber 308. The central fiber includes four FBGs 310, 312, 314 and 316 and is connected to a second three-port circulator 318 to function as an input. An add fiber 320 and an output fiber 322 are also connected to the second circulator 318. In a drop operation, one of a group of optical carriers that propagate from the input fiber 304 to the central fiber 308 is reflected back to the circulator 302 by an appropriately constructed FBG and is directed to the drop fiber 306. In an add operation, an optical carrier is introduced to the central fiber from the add fiber 320 via the second circulator 318, but is reflected back to the second circulator for output via the output fiber 322. The conventional add/drop module does not have the ability to adjust to fluctuations in optical carrier wavelength. The FBGs are manufactured to the predetermined wavelengths of the target optical carriers and no dynamic adjustment is attempted.

Many examples of the use of FBGs in add and/or drop multiplexers exist. U.S. Pat. No. 5,555,118 to Huber discloses a method for removing and inserting optical carriers in a wave-division multiplexed (WDM) optical communication system, and U.S. Pat. No. 5,600,473, also to Huber, discloses optical amplifier systems with add/drop multiplexing. The Huber patents disclose the use of FBGs in add and drop multiplexers of the type used to manipulate optical cable TV signals in cable TV networks but do not disclose the ability to adjust the FBGs in response to fluctuations in the wavelength of an optical carrier.

European Pat. No. EPO 0730172 A1 to Chawki also discloses an optical add/drop multiplexer using optical circulators and a photo-induced Bragg grating. The disclosure acts in much the same way as the Huber systems to add and/or drop at least one optical signal with a determined wavelength from a group of signals. Each FBG is set to a predetermined wavelength and is able to be tuned in a first state in which the FBG reflects the signal with the predetermined wavelength, thereby transmitting the signals with other wavelengths. One or more FBGs can also be set in a second state, in which the adjusted FBGs transmit all of the signals. Chawki's add/drop system has two circulators and four FBGs, such as the one shown in FIG. 1. Signals are dropped through the left circulator and added through the right circulator.

Lastly, an article by C. R. Giles, "Lightwave Applications of Fiber Bragg Gratings," is published in the *Journal of Lightwave Technology*, Volume 15, No. 8, August 1997. In the article, a four channel FBG add/drop multiplexer and an FBG dispersion compensator are disclosed. Neither of the two devices provides a system that allows the FBGs to be adjusted in response to fluctuations in the wavelength of a target optical carrier.

The delivery of lightwave data in all of the above-described documents is similar. To deliver lightwave data in an optical network, light is pulsed through a waveguide. The light is typically sent at a known wavelength, and digital data is modulated onto the carrier wavelength. The carrier wavelength, known as the optical carrier, is most effective when the carrier wavelength is fixed throughout transmission. Maintaining a constant carrier wavelength is especially important to devices utilizing FBGs. As described above, FBGs are wavelength-dependent and are typically fabricated to operate on a particular wavelength or within a narrow bandwidth of wavelengths.

Unfortunately, the conventional sources of light, such as laser diodes, are not able to generate a stable optical carrier with the wavelength locked within the tolerances presently desired. For example, FBGs can effectively filter out a signal with a bandwidth of 0.2 nm at a single wavelength of 1550 nm. Therefore, if the wavelength of the optical carrier varies outside the bandwidth of the FBG, the filtering efficiency of the FBG is greatly reduced. This is true even for wavelength tunable FBGs that have the ability to effect different optical carrier wavelengths. If the filtering efficiency of an FBG is reduced, the effectiveness of optical devices such as add/drop multiplexers and dispersion compensators declines. An unstable optical carrier may allow the optical carrier to inadvertently propagate through a properly tuned FBG. Conversely, an unstable optical carrier may cause the optical carrier to be inadvertently reflected by an FBG.

What is needed is a method and system that allows the dynamic adjustment of a fiber Bragg grating in response to a varying optical carrier wavelength so that the optical carrier can be effectively manipulated in optical devices such as add/drop modules and dispersion compensators.

SUMMARY OF THE INVENTION

The invention is a system and method for adjusting a tunable fiber Bragg grating in response to fluctuations in the wavelength of an optical carrier. One embodiment involves the insertion of a modulated broadband optical signal into a waveguide containing the target FBG, and another embodiment involves modulating a tracking grating and monitoring the optical signal generated by the modulated tracking grating. The embodiments can be used in various optical devices, but are particularly suitable to be applied to add and/or drop modules and dispersion compensators. The preferred embodiment of an adjustable system in an add and/or drop module includes a three-port optical circulator, three optical fibers that are selectively coupled by the circulator, a series of tunable FBGs along one of the fibers, a source of a broadband optical noise signal, an optical spectrum analyzer, and an FBG tuner.

The optical circulator has first, second and third ports respectively coupled to first, second and third optical fibers. By operation of the circulator, the second fiber receives an input of optical carriers from the first fiber and is able to output one or more optical carriers to the third fiber, but the fibers are otherwise isolated from one another. The tunable FBGs are located along the second fiber and are dynamically tuned in response to detection that transmission characteristics of targeted optical carriers have changed. In this embodiment, a selected FBG is "roughly" tuned to reflect a targeted optical carrier and is dynamically "fine" tuned to increase the efficiency of back-reflecting the targeted optical carrier.

The optical spectrum analyzer (OSA) is utilized to monitor transmission characteristics of a lightwave signal. The transmission characteristics of interest are preferably either transmissivity or reflectivity as a function of relative or absolute wavelength.

In one embodiment, an LED or other appropriate broadband light source generates amplitude modulated probe lightwaves in the same wavelength band as the optical carriers. The modulated probe lightwaves are introduced into the first optical fiber at a first coupler. The modulated probe lightwaves propagate through the circulator and enter the second optical fiber that includes the dynamically tunable FBGs. The modulated probe lightwaves are partially reflected by the FBGs and partially propagate through the FBGs. A small portion of the optical energy of the combined signals of the non-reflected modulated probe lightwaves and the non-reflected optical carriers is tapped from the second optical fiber. The tapped portion of the combined signals is directed to the OSA, while the larger portion of the optical energy of the optical carriers is left unaffected by the tracking procedure.

At the OSA, both the modulated LED-generated lightwaves and the optical carriers are analyzed. The OSA separates the modulated probe lightwaves from the optical carriers using conventional lock-in techniques. The condition of one or more of the FBGs with regard to efficiently reflecting one or more targeted optical carriers is determined by measuring optical power at different wavelengths for the modulated probe lightwaves that propagated through the FBGs and comparing them to the center wavelengths of the optical carriers. By combining information regarding the FBG conditions with information regarding optical carrier locations, the FBGs in the system can be continuously tuned. Tuning the FBGs is executed on an as-needed basis and is implemented by a controller.

A system as described above can be used in optical devices such as add modules, drop modules, add/drop modules or dispersion compensators. The important advantage of the invention is that a fluctuating optical carrier wavelength can be tracked relative to the positions of the FBGs. The tracking information can then be supplied to the controller and the FBGs can be tuned in response to the fluctuation of the optical carrier wavelength. Responsive tuning of FBGs ensures that a target optical carrier is efficiently filtered from a group of optical carriers. Responsive tuning also allows an optical carrier to propagate through optical devices such as add or drop modules with minimum loss when the optical carrier is not intended to be added or dropped. Another advantage is that the OSA does not need to be wavelength calibrated, since the OSA compares differences between modulated probe lightwaves and optical carriers, rather than the absolute determination of the wavelengths of individual optical signals.

In an alternative embodiment of an optical system such as an add/drop module, optical carriers can be tracked using an FBG as a tracking grating. The tracking FBG is distinguishable from a standard filtering FBG, since the tracking FBG has a narrower bandwidth, has a slightly broader tuning range, and is intentionally less efficient in providing reflection. The tracking grating is also modulated in amplitude or frequency so that the reflected signal can be identified by a receiver. To track an optical carrier in this embodiment, the tracking grating is tuned so that a small portion of the optical energy of the target optical carrier is reflected. The target signal is reflected through a circulator and into a receiver located in a third fiber. The receiver can monitor the specially modulated signals from the tracking grating and determine the center of the optical carrier channel. By continuously tracking the optical carrier, the associated filtering FBG can be responsively tuned to efficiently reflect or pass a fluctuating optical carrier.

The optical systems of the present invention may include additional features or alternative embodiments. For example, planar glass may be used as a waveguide in place of the optical fibers. FBGs are formed inside the planar glass by treating the glass, such as by selective ionization. In another embodiment, a series of FBGs having different target wavelengths are originally formed on the same optical fiber, instead of on different fiber portions that are subsequently spliced together to form a single fiber. In another embodiment, FBGs are tuned utilizing laser light or RF induction. Lastly, an add and/or drop module is disclosed that has a bypass mode.

DETAILED DESCRIPTION

Figure 2:
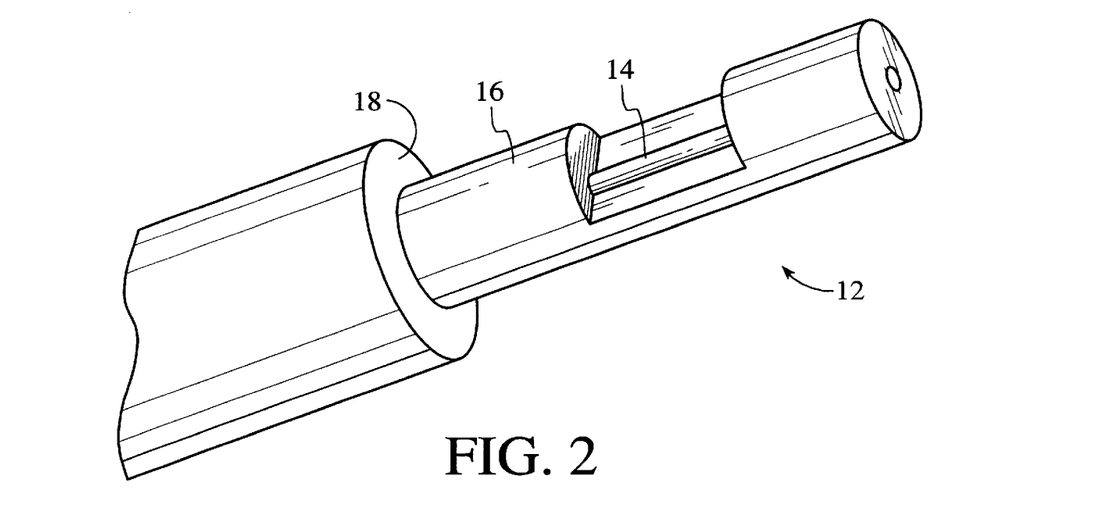
FIG. 2 is a depiction of a conventional optical fiber.
Figure 3:
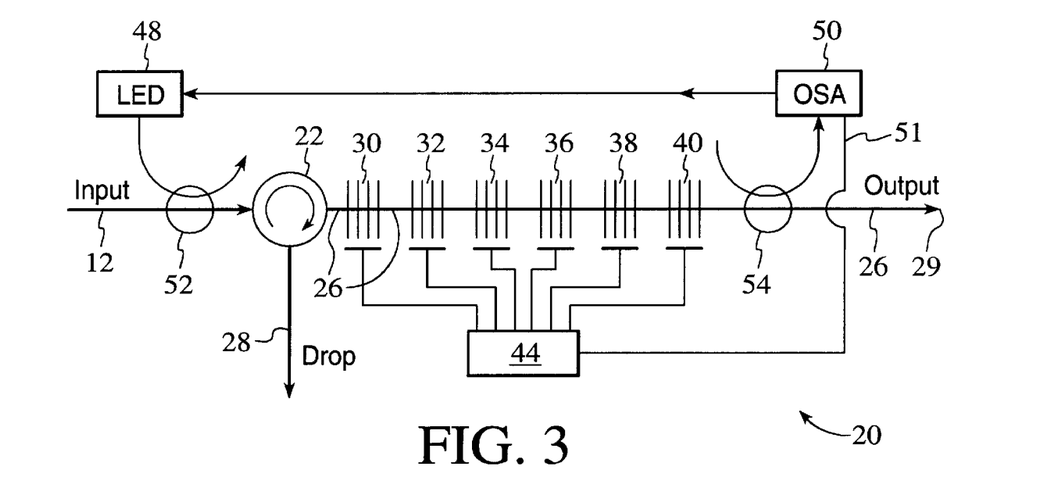
FIG. 3 is a depiction of a drop module utilizing LED wavelength tracking in accordance with the present invention.

With reference to FIGS. 2 and 3, light pulses are supplied to an input fiber 12 of a lightwave system, such as a drop multiplexer 20, by a light source (not shown), such as a laser. Presently, light from such a source is not necessarily delivered with the precision required for high efficiency processing. That is, the wavelength (i.e., frequency) of an optical carrier generated by a laser may fluctuate from the nominal wavelength during its delivery along an optical fiber 12. When the wavelength of an optical carrier fluctuates from the nominal wavelength, the filtering capability of an FBG can be greatly reduced and, consequently, the function of an optical device such as an add/drop multiplexer or a dispersion compensator utilizing an FBG is negatively affected. In contrast to conventional systems, the method and system of the present invention allows the fluctuations in an optical carrier to be continuously tracked in, for example, an add multiplexer, drop multiplexer, an add/drop multiplexer or a dispersion compensator. Information gathered from the continuous tracking of the optical carrier is then applied to tuning the appropriate FBG to reflect an optical carrier having the desired wavelength.

The first element of the preferred drop multiplexer is the waveguide. FIG. 2 is a depiction of a standard waveguide in the form of an optical fiber 12. However, the invention may be used in systems that utilize other types of waveguides, such as the treated glass of FIG. 12. The optical fiber 12 of FIG. 2 has a cylindrical core 14 that is made of doped glass. The core is specially treated to provide the passageway through which lightwaves travel. The core is surrounded by a glass cladding 16. The glass cladding aids in directing the lightwaves. The glass in the cladding has a lower refractive index than that of the core. Light propagating along the fiber core is bent at the interface of the core and the cladding toward the core, since the core has the higher refractive index.

The outer layer of the optical fiber is the coating 18. The coating of the optical fiber protects the core and the cladding from the environment. A group of optical fibers is commonly bundled together to create a fiberoptic cable. In a fiberoptic cable, the coating also prevents light from the bundled fibers from interfering with one another's signals.

Figure 12:
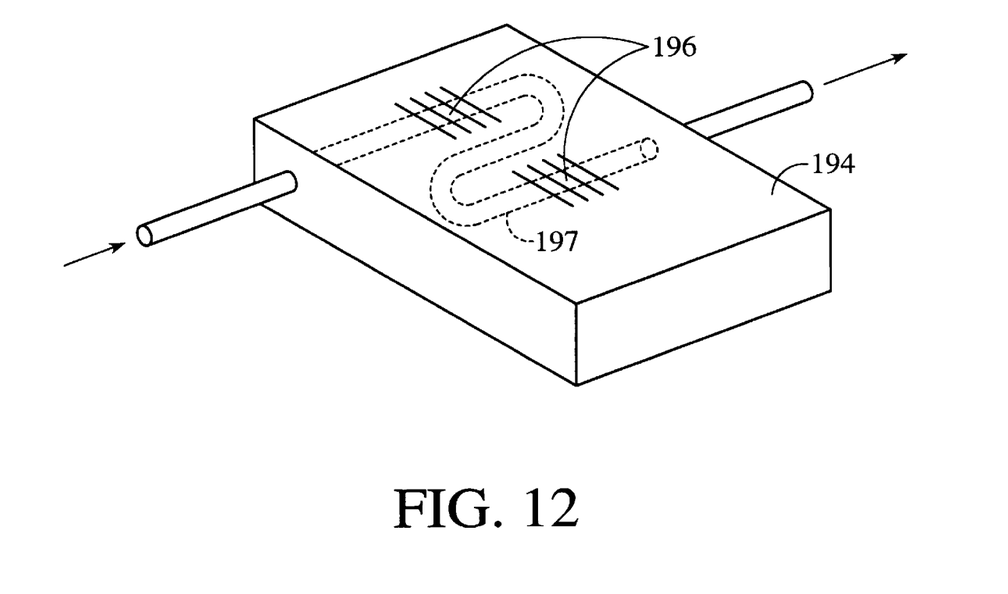
FIG. 12 is planar glass with FBGs in accordance with the present invention.

Although a waveguide in the form of the optical fiber 12 has been described, other waveguides may be utilized, such as the waveguide 194 of FIG. 12 or a thermally expanded core (TEC) fiber having an expanded core at its opposite ends.

Referring to FIG. 3, a drop multiplexer 20 in the preferred embodiment uses a three-port optical circulator 22 as a directional optical transfer device. The operation of the circulator allows optical carriers to pass in only designated directions. Optical carriers traveling in the first optical fiber 12 are input into the circulator through the first port. The optical carriers propagate through the circulator to the second port and into the second optical fiber 26. The second optical fiber 26 is considered, for description purposes, to extend from the circulator 22 to the output point 29. The circulator isolates the optical carriers propagating in the second optical fiber from propagating to the first fiber. In contrast, the circulator directs optical carriers from the second fiber to the third fiber 28, but prevents the reverse exchange of optical carriers.

An optical coupler can also be used to transfer optical carriers between fibers. The optical coupler can be used to add or drop, in conjunction with other devices, a signal from the first fiber 12. The optical coupler does not have the directional characteristics of the circulator, since it allows signals to travel in both directions. As a result, couplers are often used in conjunction with isolators that permit light to travel in one direction only. Although optical couplers have some different characteristics, they may be used to form alternative embodiments of the present invention.

As described above, an FBG establishes a periodic change in the refractive index along a core of an optical waveguide. The specific design of each FBG determines the target wavelength of light that the FBG is able to reflect. In FIG. 3, six FBGs 30, 32, 34, 36, 38 and 40 are depicted in a series. The six FBGs all have different target wavelengths.

The six FBGs 30–40 are wavelength tunable. A wavelength tunable FBG is one in which the reflectivity characteristics of the FBG can be changed such that the FBG reflects optical carriers over a range of wavelengths. Tuning of an FBG can be performed in many ways. Conventional tuning systems 44 include using piezo-electric devices to mechanically tune FBGs or temperature control devices to thermally tune FBGs. Piezo-electric devices place mechanical stress or strain on the FBG to alter the FBG's reflected wavelengths. Varying the temperature of an FBG changes the target wavelength of an FBG in relationship to the FBG's temperature tuning coefficient. Applying resistive heat is a conventional way to tune an FBG.

An LED 48 in FIG. 3 is a conventional LED. The LED generates a broadband optical signal. The LED used in the preferred embodiment is modulated so that the LED signal can be distinguished from the optical carriers. Although the LED is shown coupled to the input optical fiber 12, the LED may be coupled in other locations, such as to optical fiber 26. As an alternative to an LED, a tunable laser can also provide a similar broadband optical signal.

An optical spectrum analyzer (OSA) 50 can be a basic OSA with minimal calibration capability that is able to monitor various transmission characteristics of a lightwave signal. Measured characteristics of interest in the invention are transmissivity and reflectivity as a function of wavelength. Outputs from the OSA are transmitted through electrical connection 51.

The function of the wavelength tracking system in a drop module is described with reference to FIGS. 3–6. Referring to FIG. 3, the LED 48 generates modulated probe lightwaves. The probe lightwaves are inserted into the first optical fiber 12 at a first weak (1–5%) coupler 52. The modulated LED probe lightwaves propagate through the circulator 22 and into the second optical fiber 26. The modulated LED probe lightwaves then travel past the FBGs and a small portion of the combined signals (i.e., 1–5%) of the modulated LED probe lightwaves and the non-reflected optical carriers are tapped from the second optical fiber. Tapping into the second optical fiber is achieved using a second coupler 54. The tapped portion of the combined signal is directed to the OSA, while the larger untapped portion continues to conventional transmission or signal processing equipment.

Figure 4:
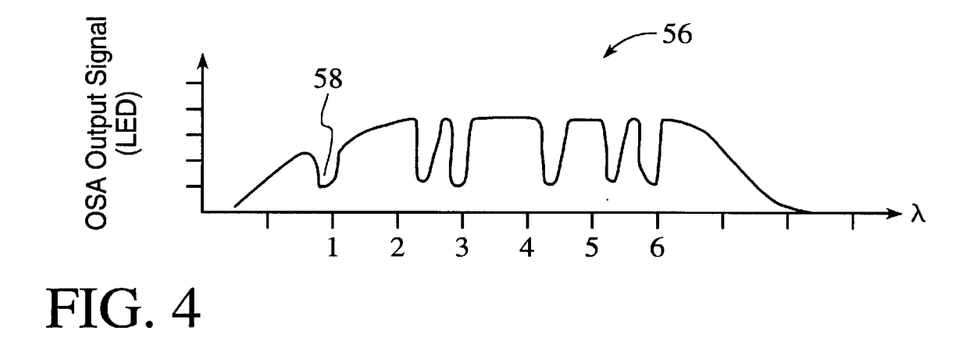
FIG. 4 is a representation of the power spectrum of modulated LED lightwaves received from a system with six Bragg gratings.

At the OSA 50, the wavelengths of both the modulated probe lightwaves and the optical carriers are monitored. The OSA separates the modulated LED probe lightwaves from the optical carriers using conventional techniques, for example a lock-in technique. FIG. 4 is a representation of the power spectrum of the modulated probe lightwaves 56 received at the OSA. The valleys 58 in the power spectrum represent the locations, in terms of wavelength, of the six FBGs 30–40 of FIG. 3. Reflection conditions of the FBGs are identified by the valleys, because the valleys represent positions at which the broadband-modulated probe lightwaves are reflected back by the six FBGs.

Figure 5:
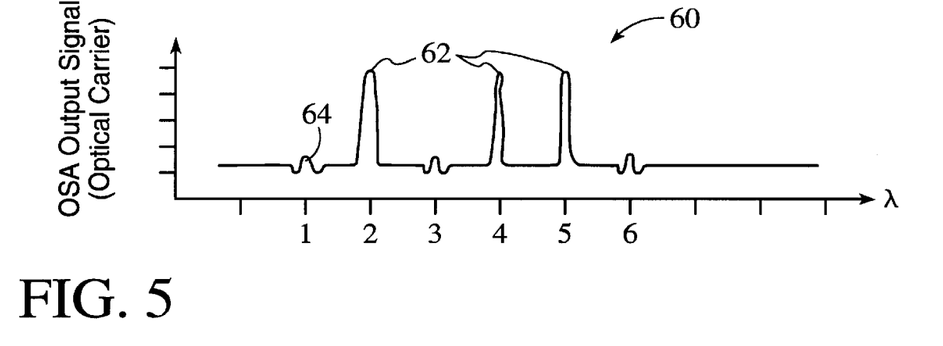
FIG. 5 is a representation of the power spectrum of six optical carriers in a WDM signal.

FIG. 5 is a representation of the power spectrum of six optical carriers 60 in a wavelength division multiplexed (WDM) signal as measured at the OSA. The peaks 62 represent optical carriers that are not reflected back by FBGs. The series of two small valleys 64 represents wavelengths at which optical carriers are reflected back by the FBGs. FIGS. 4 and 5 can be viewed together to see how the FBG tuning relates to signal transmission. At wavelength position 1, an FBG is tuned onto an optical carrier. As a result, the optical carrier does not travel to the OSA, but is instead reflected back. At position 2, an optical carrier is present, but the corresponding FBG is tuned slightly off the frequency of the optical carrier, allowing the optical carrier to pass through to the coupler 54 and, therefore, to the OSA. At positions 3 and 6, the corresponding FBGs are tuned to the optical carriers and the optical carriers are reflected back. At positions 4 and 5, the corresponding FBGs are not tuned to the optical carriers and the optical carriers travel to the OSA.

In order to effectively filter an optical carrier that is fluctuating over time, it is necessary to track the fluctuation of the optical carrier and adjust the FBGs as necessary. In the system described in FIGS. 3–5, the optical carrier signals can be tracked with the OSA using DC detection. The results of the tracking correspond to FIG. 5. The reflection wavelength of the FBGs can also be determined with the OSA by monitoring the modulated LED probe light. By combining the feedback related to optical carrier wavelength and FBG reflection wavelength, the FBGs can be continuously tuned as needed by a conventional tuning system 44. Because the system is tuned in response to a comparison of the optical carrier wavelength to the FBG reflection wavelength, calibration of the OSA to determine actual wavelength measurements is not critical.

In alternative embodiments of the invention, if the transmitted optical energy of the non-reflected optical carriers is too small to ensure reliable analysis by the OSA 50 in the location in FIG. 3, an additional OSA can be used at the third optical fiber 28 of circulator 22. In another embodiment, a single OSA can be shared between the second fiber 26 and the third fiber 28 by coupling a monitoring fiber off each of the two fibers 26 and 28 and connecting a switch to the two monitoring fibers. The switch is then changed back and forth to monitor either the second fiber or the third fiber. In another embodiment, the OSA can be incorporated into the second fiber 26.

Figure 6:
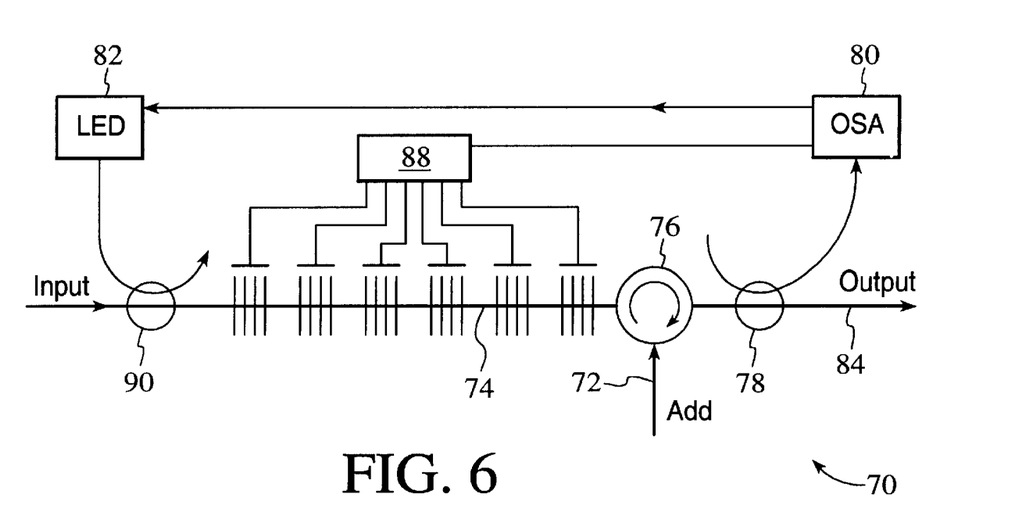
FIG. 6 is a depiction of an add module utilizing LED wavelength tracking in accordance with the present invention.

The invention can also be applied to an add module. FIG. 6 is a depiction of an add module 70 with wavelength tracking using a modulated LED probe lightwave source 82 and an OSA 80. In operation, an optical carrier is added through a third optical fiber 72 and a broadband LED probe lightwave signal is inserted through a coupler 90 into a second optical fiber 74 containing the FBGs. The LED probe lightwaves, along with a group of optical carriers, travel through the circulator 76 to a first optical fiber 84. A sample of the LED lightwaves and the optical carriers is then tapped off at the OSA coupler 78.

The OSA monitors the center wavelengths of the optical carriers and the target wavelengths of the FBGs. By comparing the center wavelengths of the optical carriers and the target wavelengths of the FBGs, the controller 88 can tune the FBGs as needed to reflect or pass individual optical carriers.

Although the add and drop modules are discussed separately, the two modules can be combined to form an add and drop module with wavelength tracking. In an add and drop module, one LED and one OSA may be used or more than one LED and more than one OSA may be used. In a combined add/drop module, an isolator may be needed between add and drop FBGs to prevent add signals from interfering with the drop portion of the module and to prevent resonant cavities from occurring between the FBGs.

In addition to add and drop modules, the devices described with reference to FIGS. 3 and 6 can be used with dispersion compensators. Dispersion compensators with FBGs utilize the wavelength-dependent time delay created during optical carrier reflection to balance the time dispersion of individual optical pulses in WDM signals. Adjusting the FBGs in response to fluctuations in the wavelengths of the individual optical carriers that make up the WDM signal allows more accurate time delay correction.

Figure 7:
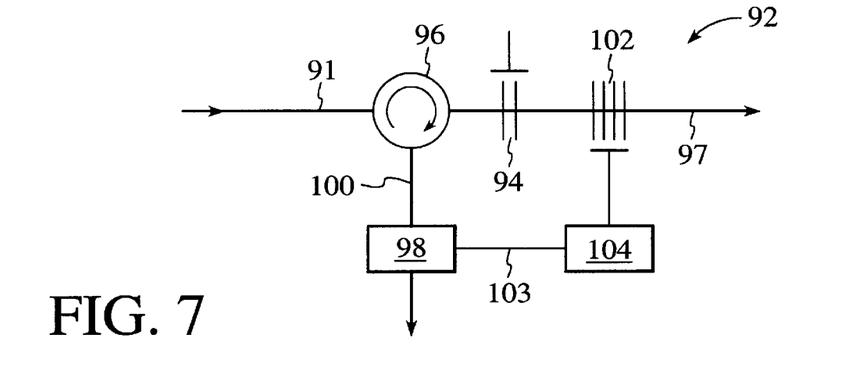
FIG. 7 is a depiction of an alternative embodiment of the present invention.

FIG. 7 is an alternative embodiment of a drop module 92 that implements a different technique to track the optical carriers. The drop module has an input optical fiber 91, a circulator 96, and an output optical fiber 97. Instead of using modulated LED probe lightwaves to track the optical carriers, this embodiment utilizes a tracking FBG 94. A tracking FBG is different from a standard filtering FBG since the tracking FBG has a narrower bandwidth, has a slightly broader tuning range, and is intentionally less efficient with respect to inducing reflection. The tracking grating reflectivity is also modulated in amplitude or frequency, so that the reflected signal can be identified by a receiver. The technique of modulating is also referred to as "dithering." Although only one tracking grating and one filter grating are shown for discussion purposes, additional filter gratings and tracking gratings can be added to handle a wider range of signals.

To track an optical carrier in this embodiment, the dithered tracking grating is progressively swept across the entire bandwidth of the optical carrier signal. Progressively tuning the tracking grating across the entire bandwidth of the optical carrier causes a small percentage of the optical carrier to be reflected over the entire bandwidth of the optical carrier. The target signal is reflected in a modulated form through the circulator 96 and into a receiver 98 located along a third optical fiber 100. The receiver monitors the specially modulated signal from the tracking grating 94. The optical carrier signal center is determined from the monitored signal that is created from the dithered signal. By constantly tracking the optical carrier, the associated filtering FBG 102 can be dynamically tuned to efficiently reflect or pass a fluctuating optical carrier.

The reflective wavelength of the filtering FBG can be determined in a controller 104 by accessing a wavelength versus temperature or wavelength versus strain look-up table. Alternatively, the reflective wavelength of the filtering FBG can be determined by knowing the wavelength versus temperature or wavelength versus strain relationship for the tracking FBG 94 and using the commonality between the filtering FBG and the tracking FBG to determine the reflective wavelength of the filtering FBG.

The controller 104 is used to execute the dynamic tuning of the filtering FBG 102. The controller changes the temperature of the FBG by changing the current through, for example, a thermoelectric cooler. The temperature change is monitored by a thermistor.

Figure 8:
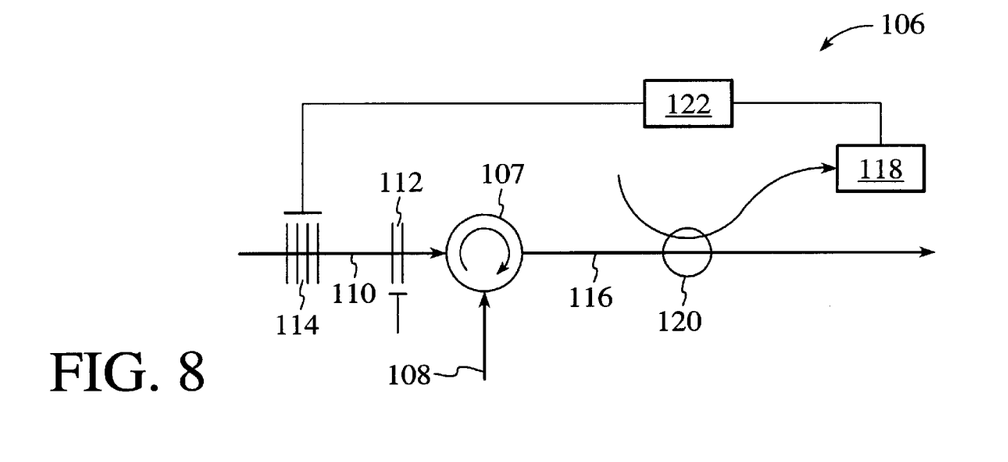
FIG. 8 is a depiction of an alternative embodiment of the present invention.

FIG. 8 is an alternative embodiment of an add module 106 utilizing the tracking grating technique for tracking a fluctuating optical carrier. In this embodiment, an optical carrier is directed to a circulator 107 through a third fiber 108. The circulator transfers the optical carrier to a second fiber 110 having FBGs 112 and 114. The first FBG is a tracking grating 112 and the second FBG is a filter grating 114. The tracking grating is tuned to reflect a small sample of the target optical carrier. The reflected portion travels through a first fiber 116 and a small sample is tapped off through a coupler 120 into a receiver 118. The receiver interprets the dithered tracking signal, and a grating controller 122 can then tune the filter FBG in response to information from the receiver. The tracking grating can continuously track an optical carrier at time intervals that allow a tuning grating to fluctuate in unison with fluctuations in the optical carrier.

Figure 9:
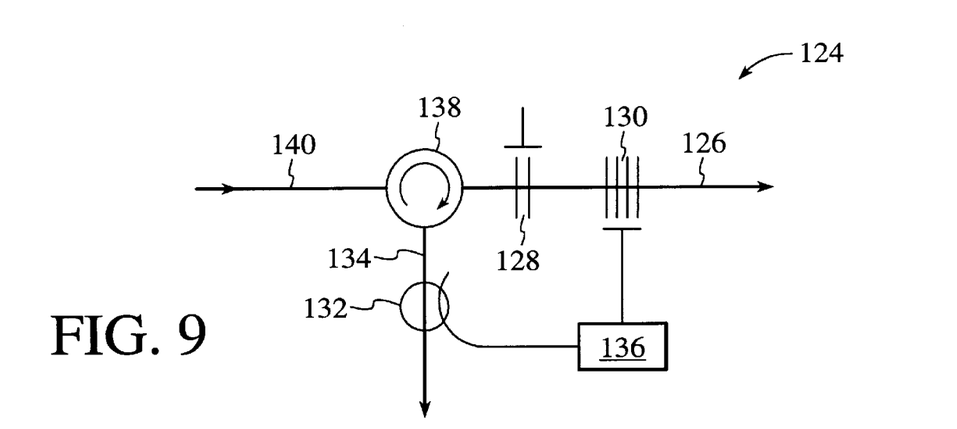
FIG. 9 is a depiction of an alternative embodiment of the present invention.

FIG. 9 is a depiction of an alternative embodiment of a drop module 124 with an optical carrier wavelength tracking system using a tracking grating. The embodiment includes three optical fibers connected to a circulator 138. A second fiber 126 has a modulated tracking grating 128 and a filter grating 130, where both gratings are tunable FBGs. There is an optical coupler 132 connected to the third fiber 134 and a receiver/controller mechanism 136 connected to the coupler and the tunable filter FBG 130. In operation, optical carriers are input through the first fiber 140 and into the second fiber. The tracking grating in the second fiber reflects a small portion of the target optical carrier back to the circulator 138 and into the third fiber 134. At the coupler 132 in the third fiber, a small sample (typically 1–5%) of the optical carrier signal is tapped off and sent to the receiver/controller 136. The receiver/controller 136 processes the signal and determines the center wavelength of the optical carrier. With the center wavelength of the optical carrier known, the controller can tune the filter FBG. The filter FBG is typically tuned to either completely reflect the optical carrier or to completely pass the optical carrier.

Figure 10:
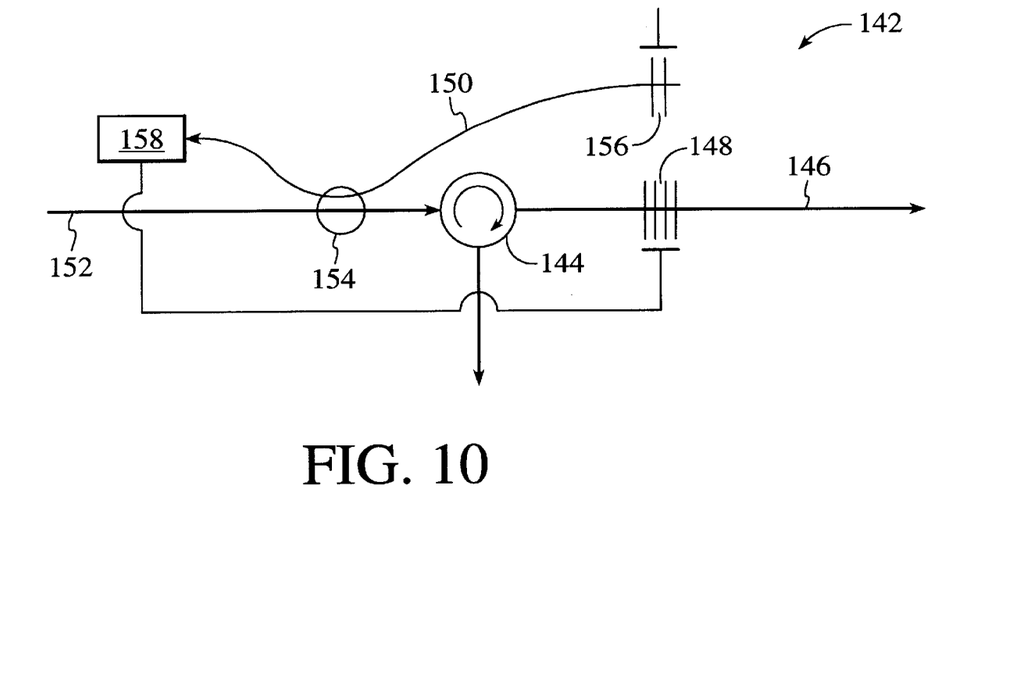
FIG. 10 is a depiction of an alternative embodiment of the present invention.

FIG. 10 is a depiction of another alternative embodiment of a drop module 142 with an optical wavelength tracking system. The embodiment includes three optical fibers connected to a three-port circulator 144. A second fiber 146 contains a filter grating 148. A tracking fiber 150 and a tracking grating 156 are coupled to the first fiber 152. In operation, the coupler 154 on the first fiber taps off a small sample of the optical carrier signal. The optical carrier is reflected back along the tracking fiber by the tracking grating. A receiver/controller 158 is connected to the tracking fiber. The receiver processes the signal and determines the center wavelength of the optical carrier. With the center wavelength of the optical carrier known, the controller can tune the filter FBG. Since the tracking fiber is separate from the main optical carrier signal, the tracking grating does not have to be specially modulated to be identified by a receiver.

Figure 11:
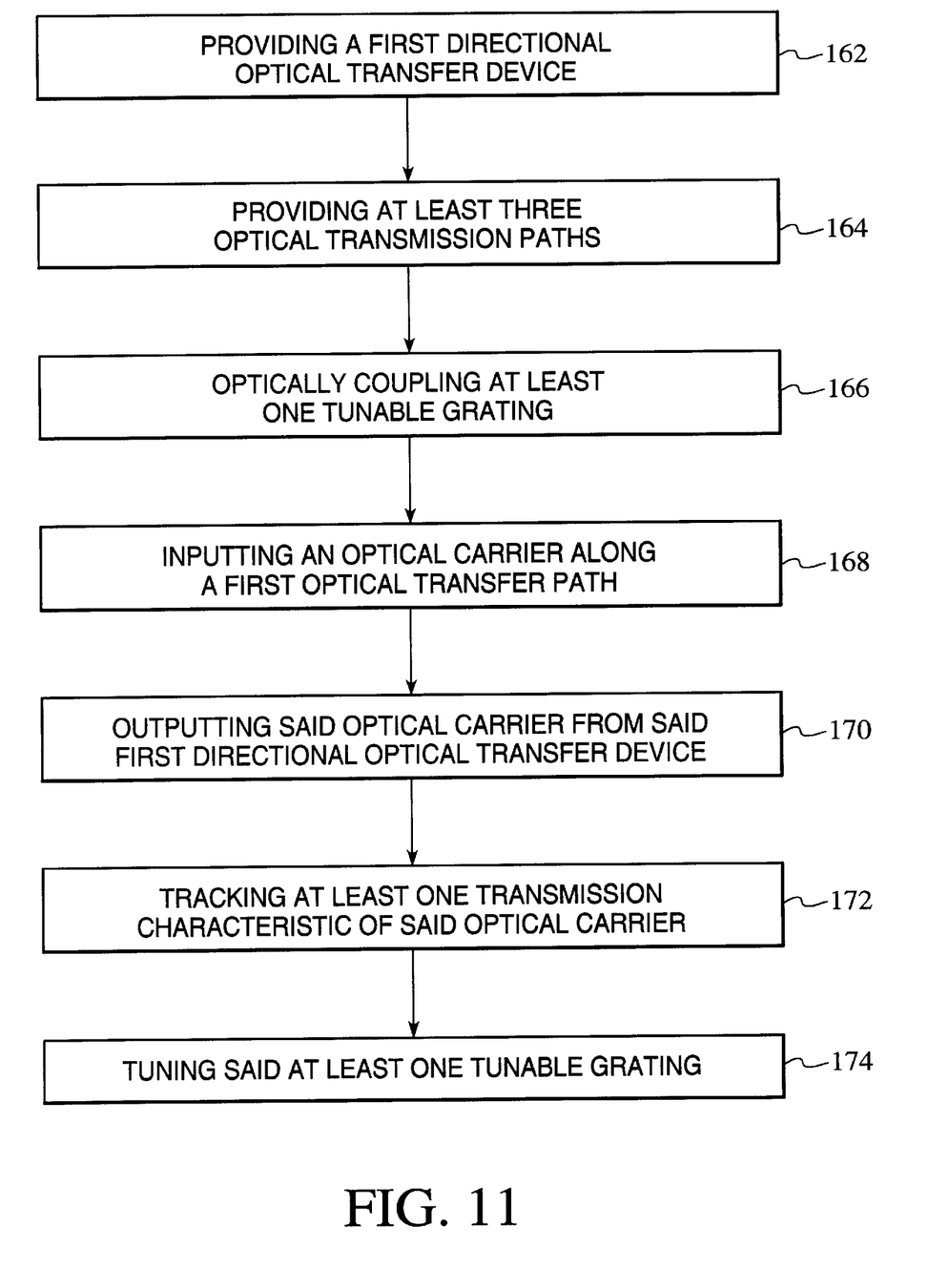
FIG. 11 is a method for tracking an optical carrier in an add and/or drop module in accordance with the present invention.

FIG. 11 depicts a method of transmitting an optical carrier. The first step 162 in the method is to provide a first directional optical transfer device having at least three optical ports for the input and output of a group of optical carriers. The next step 164 is to provide at least three optical transmission paths, with the three optical transmission paths respectively connected to the three optical ports of the directional optical transfer device. The next step 166 is optically coupling at least one tunable grating to one of the optical transmission paths. The tunable grating has the ability to reflect a selected optical wavelength. The next step 168 is to input an optical carrier along a first optical transmission path and into the first directional optical transfer device. The first optical transmission path is one of the three previously identified optical transmission paths. The next step 170 is to output the optical carrier from the first directional optical transfer device along a second optical transmission path, where the second optical transmission path is optically coupled to at least one tunable grating. The next step 172 is to track at least one transmission characteristic of the optical carrier. The last step 174 is to dynamically tune the tunable grating in response to data gathered from the tracking of the transmission characteristic of the optical carrier. The grating is tuned such that the optical carrier is reflected back and dropped from a group of optical carriers, added to a group of optical carriers, or the time-shape of the pulses on the optical carrier is adjusted to compensate for wavelength dispersion.

One problem involved with using FBGs in optical systems is cladding loss. Referring to FIG. 2, cladding loss is caused when light reflected by FBGs couples from the core of an optical fiber into the cladding of the fiber. The light in the cladding then couples back into the core and interferes with the original light traveling in the core. In order to control cladding loss, absorbent rings are formed in the cladding of the fiber. The absorbent rings are formed by adding dopants to the cladding. The dopants in the cladding prevent light from traveling from the cladding back into the fiber.

A "waveguide" is defined herein as any structure that establishes a transmission path for lightwave information transmissions. Although optical fibers are the preferred waveguides, there are other waveguides that may be used in lightwave add and/or drop modules of the type described above. One example of an alternative waveguide is planar glass. Referring to FIG. 12, planar glass 194 can be used to direct lightwaves by providing a pattern of ionization that defines a transmission path 197 by changing the refractive index of the glass along the transmission path. Gratings 196 can be formed inside the planar glass. The gratings are formed internally in the glass structure and have similar characteristics to gratings in optical fibers.

FBGs that are formed in optical fibers are conventionally manufactured in a process in which multiple FBGs having the same target wavelength are formed on a single optical fiber. The single optical fiber is then diced into individual FBG fiber segments. To form a fiber with FBGs at different target wavelengths, such as the module shown in FIG. 3, separately manufactured FBG fiber segments are spliced together to create one continuous fiber with different FBGs. In an alternative embodiment of an add/drop module, FBGs that have different target wavelengths can be formed on a single fiber. Having the FBGs formed on a single fiber can reduce the transmission losses created by splicing FBGs together onto one single fiber.

Conventional methods for tuning FBGs include piezoelectric compression and thermal resistive heating. Both of these conventional methods can be applied to the embodiments of the present invention. In addition to the conventional methods, alternative methods can be applied. Two alternative tuning methods include utilizing laser light and RF induction.

Figure 13:
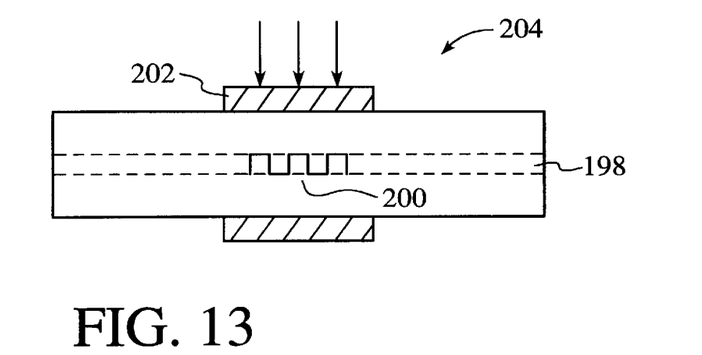
FIG. 13 is a depiction of a system for tuning an FBG using a laser light in accordance with the present invention.

Using laser light to tune an FBG is described with reference to FIG. 13. FIG. 13 shows an optical fiber 198 with an FBG 200 formed inside the optical fiber. The optical fiber has an annular thermally conductive material 202 that is placed around the optical fiber at the point where the FBG is located. Laser light 204 is then systematically applied to the area of the fiber that contains the grating. The laser light generates heat on impact with the thermally conductive material. The intensity of laser light applied to the area of the fiber that contains the grating directly affects the temperature of the grating, which in turn manipulates the target wavelength of the grating. Laser light can be applied with high accuracy and the laser light doses can be calibrated to provide responsive temperature control.

Figure 14:
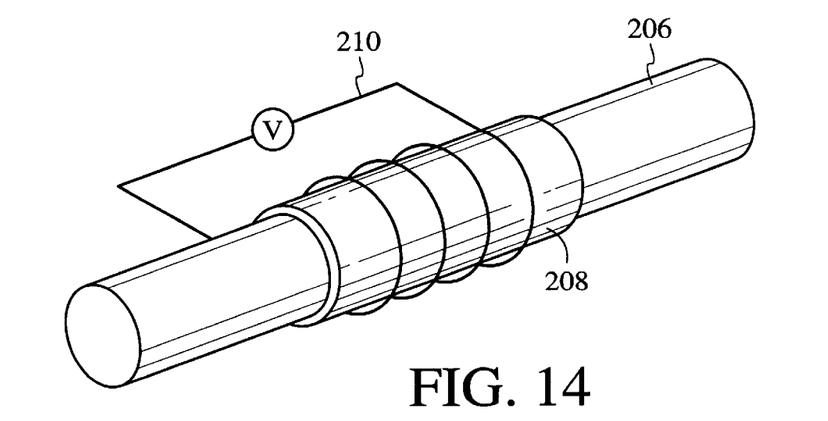
FIG. 14 is a depiction of a system for tuning an FBG using RF induction in accordance with the present invention.

Using RF induction to tune an FBG is described with reference to FIG. 14. FIG. 14 shows the outside of an optical fiber 206 with an FBG formed inside the fiber. An annular band 208 of thermally conductive material is placed around the coating of the fiber at the location of the FBG. A conductive wire 210 is then coiled around the band of the conductive material. Voltage is applied to the conductive wire and RF induction generates thermal energy by virtue of $I^2R$ losses along the thermally conductive band, thereby tuning the FBGs.

Figure 15:
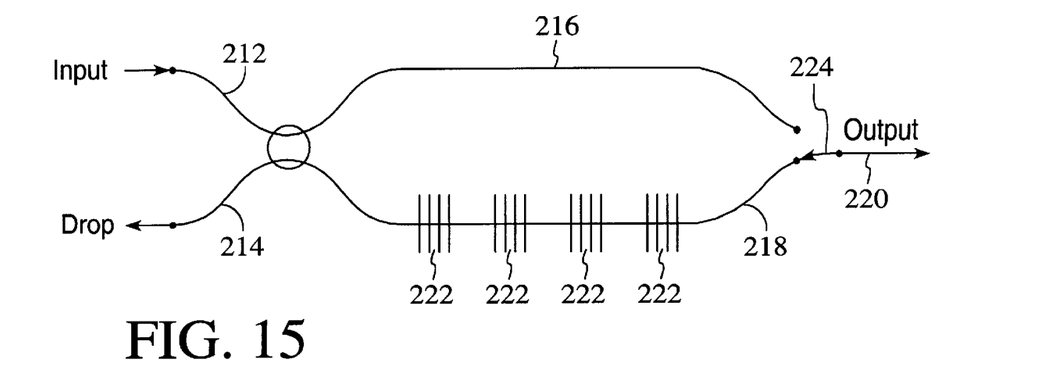
FIG. 15 is a depiction of a drop module with a bypass mode in accordance with the present invention.

Another embodiment of a drop module is present in FIG. 15. FIG. 15 represents a drop module with bypass capability. The system has an input fiber 212, a drop fiber 214, a bypass fiber 216, a grating fiber 218, an output fiber 220, a series of FBGs 222, and a switch 224. In operation, an optical carrier is propagated through the input fiber. When the switch is contacted with the grating fiber 218, the optical carriers travel through the grating fiber and are either propagated to the output fiber 220 or are reflected back through the drop fiber 214 by a particular grating. When the switch is in contact with the bypass fiber, the optical carriers travel through the bypass fiber directly to the output fiber. The bypass embodiment allows a group of FBGs to be completely bypassed if a problem occurs in an FBG or if the FBGs need to be serviced or replaced. The bypass mode embodiment can be applied to an add module as well as to a drop module.

What is claimed is:

1. A wavelength tracking and adjustment system comprising:

an optical path having an input connected to receive an optical carrier having a nominal wavelength;

a tunable grating formed along said optical path, where said tunable grating is adjustable to selectively reflect substantially all of said optical carrier having said nominal wavelength;

means for monitoring a reflectivity characteristic of said optical path in real time, said means for monitoring including a modulated broadband optical signal generator optically connected to said optical path for inserting a modulated broadband optical signal into said optical path in combination with said optical carrier, and further including an optical spectrum analyzer optically connected to said optical path for monitoring said optical carrier and reflectivity of said tunable grating, said reflectivity of said optical path being representative of a real-time reflected wavelength of said modulated broadband optical signal;

means, responsive to said means for monitoring, for dynamically adjusting said tunable grating in order to compensate for fluctuations in wavelength of said optical carrier relative to said nominal wavelength.

2. The system of claim 1 wherein said optical spectrum analyzer has an output for outputting a signal representative of a real-time measure of wavelength of said optical carrier relative to a real-time measure of reflectivity of said tunable grating as a function of wavelength.

3. A dynamically adjustable optical system comprising:

a first directional optical transfer device having first, second and third ports;

a first waveguide connected to said first port of said first directional optical transfer device;

a second waveguide connected to said second port of said directional optical transfer device;

a first tunable grating located along said second waveguide for reflecting optical energy;

means, in optical communication with said first directional optical transfer device, for tracking a wavelength of an input optical carrier, said means for tracking including:

means for introducing a modulated broadband optical signal into said second waveguide; and means for monitoring said modulated broadband optical signal after said signal has interacted with said first tunable grating in order to determine a wavelength band of reflectivity of said first tunable grating;

means for tuning said first tunable grating to reflect said input optical carrier back to said first directional optical transfer device, said means for tuning being responsive to said means for tracking said wavelength of said input optical carrier; and a third waveguide connected to said third port of said first directional optical transfer device for propagating said input optical carrier, said first, second and third ports of said first directional optical transfer device being configured such that said third waveguide is one of a source of said input optical carrier and a receiver of said input optical carrier.

4. The dynamically adjustable optical system of claim 3 wherein said means for tuning said first tunable grating is dynamically adjustable in response to said means for monitoring said modulated broadband optical signal.

5. The dynamically adjustable optical system of claim 3 further comprising:

a second directional optical transfer device optically connected to said second waveguide to receive optical energy propagating from said first directional optical transfer device;

an output waveguide connected to said second directional optical transfer device for outputting optical energy from said second directional optical transfer device; and an input waveguide connected to said second directional optical transfer device such that an optical carrier can be inserted into said second waveguide and reflected by a second tunable grating back to said second directional optical transfer device and output through said output waveguide.

6. The dynamically adjustable optical system of claim 3 wherein said means for tuning said first tunable grating includes one of a source of laser light and a source of RF induction.

7. The dynamically adjustable optical system of claim 3 further including a bypass optical fiber, an optical switch, and an output fiber, said bypass optical fiber being connected to said first directional optical transfer device to provide a transmission path that is in optical parallel to said second waveguide, said optical switch being connected to said second waveguide and said bypass optical fiber at ends opposite to said first directional optical transfer device.

8. A method of transmitting an optical carrier comprising the steps of:
   providing a first directional optical transfer device having at least three optical ports for the input and output of optical carriers;
   providing at least three optical transmission paths having a one-to-one correspondence with said optical ports;
   optically coupling at least one tunable grating to one of said at least three optical transmission paths, said tunable grating being adjustable to reflect a target wavelength band;
   inputting an optical carrier along a first optical transmission path and into said first directional optical transfer device, said first optical transmission path being one of said at least three optical transmission paths, said optical carrier having a transmission wavelength;
   outputting said optical carrier from said first directional optical transfer device and along a second optical transmission path, said second optical transmission path being optically coupled to said at least one tunable grating, said second optical transmission path being one of said at least three optical transmission paths;
   tracking said transmission wavelength of said optical carrier; and
   dynamically tuning said at least one tunable grating in response to data generated from said tracking of said transmission wavelength of said optical carrier.

9. The method of claim 8 further including the steps of inserting a modulated broadband optical signal into one of said at least three optical transmission paths that contains said tunable grating and monitoring said modulated broadband optical signal after said modulated broadband optical signal has optically contacted said at least one tunable grating, said monitoring helping to determine said target wavelength band of said at least one tunable grating.

10. The method of claim 9 wherein said step of dynamically tuning is a step of changing said target wavelength band of said at least one tunable grating in response to said monitoring of said modulated broadband optical signal and said tracking of said transmission wavelength of said optical carrier.

11. The method of claim 8 wherein the step of dynamically tuning said at least one tunable grating includes reflecting said optical carrier back to said first directional optical transfer device and further includes outputting said optical carrier along a third optical transmission path, said third optical transmission path being one of said at least three optical transmission paths.

12. The method of claim 11 wherein said step of inputting an optical carrier includes a step of inputting a plurality of optical carriers and wherein said step of outputting said optical carrier includes a step of dropping said optical carrier from said plurality of optical carriers.

13. The method of claim 11 wherein said step of outputting said optical carrier along said third optical transmission path includes a step of adjusting said at least one tunable grating to compensate for time dispersion which may have occurred over said optical carrier.

14. A wavelength tracking and adjustment system comprising:
   an optical path having an input connected to receive an optical carrier having a nominal wavelength;
   a tunable grating formed along said optical path, where said tunable grating is adjustable to selectively reflect said optical carrier having said nominal wavelength;
   means for monitoring a reflectivity characteristic of said optical path in real time, said means for monitoring including a modulated tracking grating that is responsive to continuous adjustment with respect to wavelength reflectivity to define a range of wavelengths that includes said nominal wavelength of said optical carrier, said reflectivity characteristic being representative of a modulated tracking signal that is reflected by said modulated tracking grating;
   means, responsive to said means for monitoring, for dynamically adjusting said tunable grating in order to compensate for fluctuations in wavelength of said optical carrier relative to said nominal wavelength.

15. The system of claim 14 wherein said means for monitoring includes a receiver connected to receive said modulated tracking signal from said modulated tracking grating.

16. A dynamically adjustable optical system comprising:
   a first directional optical transfer device having first, second and third ports;
   a first waveguide connected to said first port of said first directional optical transfer device;
   a second waveguide connected to said second port of said directional optical transfer device;
   a first tunable grating located along said second waveguide for reflecting optical energy;
   means, in optical communication with said first directional optical transfer device, for tracking a desired optical carrier;
   means for tuning said first tunable grating to reflect said desired optical carrier back to said first directional optical transfer device, said means for tuning being responsive to said means for tracking said desired optical carrier;
   a third waveguide connected to said third port of said first directional optical transfer device for propagating said desired optical carrier, said first, second and third ports of said first directional optical transfer device being configured such that said third waveguide is one of a source of said desired optical carrier and a receiver of said back-reflected desired optical carrier; and
   said means for tracking including a first tracking grating that is modulated to reflect a modulated optical signal, said first tracking grating being optically connected to at least one of said first, second, and third waveguides.

17. A dynamically adjustable optical system comprising:
   a first directional optical transfer device having first, second and third ports;

a first waveguide connected to said first port of said first directional optical transfer device;

a second waveguide connected to said second port of said directional optical transfer device;

a first tunable grating located along said second waveguide for reflecting optical energy;

means in optical communication with said first directional optical transfer device for tracking a desired optical carrier;

means for tuning said first tunable grating to reflect said desired optical carrier back to said first directional optical transfer device, said means for tuning being responsive to said means for tracking said desired optical carrier;

a third waveguide connected to said third port of said first directional optical transfer device for propagating said desired optical carrier, said first, second and third ports of said first directional optical transfer device being configured such that said third waveguide is one of a source of said desired optical carrier and a receiver of said back-reflected desired optical carrier;

a bypass optical fiber;

an optical switch; and an output fiber;

said bypass optical fiber being connected to said first directional optical transfer device to provide a transmission path that is in optical parallel to said second waveguide, said optical switch being connected to said second waveguide and said bypass optical fiber at ends opposite to said first directional optical transfer device.

18. A method of transmitting an optical carrier comprising the steps of:

providing a first directional optical transfer device having at least three optical ports for the input and output of a plurality of optical carriers;

providing at least three optical transmission paths having a one-to-one correspondence with said optical ports;

providing a modulating tracking grating;

optically coupling at least one tunable grating to one of said at least three optical transmission paths, said tunable grating being adjustable to reflect a tuned optical carrier wavelength;

inputting an optical carrier along a first optical transmission path and into said first directional optical transfer device, said first optical transmission path being one of said at least three optical transmission paths;

outputting said optical carrier from said first directional optical transfer device and along a second optical transmission path, said second optical transmission path being optically coupled to said at least one tunable grating, said second optical transmission path being one of said at least three optical transmission paths;

tracking at least one transmission characteristic of said optical carrier by tuning said modulating tracking grating to determine the carrier wavelength of said optical carrier; and dynamically tuning said at least one tunable grating in response to data generated from said tracking of said at least one transmission characteristic of said optical carrier.

* * * * *